United States Patent
Kann et al.

(10) Patent No.: US 9,503,802 B2
(45) Date of Patent: Nov. 22, 2016

(54) CONTROLLER FOR CONTROLLING AN ELECTRONIC DEVICE

(71) Applicant: GN Audio A/S, Ballerup (DK)

(72) Inventors: Peter Ulrik Kann, Ballerup (DK); Lars Ivar Hauschultz, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 14/793,696

(22) Filed: Jul. 7, 2015

(65) Prior Publication Data

US 2016/0014496 A1     Jan. 14, 2016

(30) Foreign Application Priority Data

Jul. 8, 2014   (EP) ..................... 14176046

(51) Int. Cl.
    *H04R 1/10*        (2006.01)
    *G06F 3/01*        (2006.01)

(52) U.S. Cl.
    CPC ............... *H04R 1/1041* (2013.01); *G06F 3/01* (2013.01); *H04R 1/1033* (2013.01)

(58) Field of Classification Search
None
See application file for complete search history.

(56) References Cited

U.S. PATENT DOCUMENTS 6,300,938 B1 * 10/2001 Culver .................. G06F 3/0362
                                                                 345/156
7,925,039 B1     4/2011   Griffin
(Continued)

FOREIGN PATENT DOCUMENTS

| EP | 2403270 | 1/2012 |
|---|---|---|
| WO | WO 2011/140956 | 11/2011 |

OTHER PUBLICATIONS

European Search Report for European Application No. 14176046.2 dated Dec. 22, 2014.

*Primary Examiner* — Paul Huber
(74) *Attorney, Agent, or Firm* — Altera Law Group, LLC

(57) ABSTRACT

The present invention relates to a controller for controlling an electronic device. The invention may e.g. be used to control a headset or another electronic device connected to the controller.

The controller (1) comprises an elongate controller body (3) having a first body end (4) and a second body end (5). The controller body (3) comprises an elongate rotatable body section (10) adapted to be rotated by a user about a longitudinal axis (11) extending through the first body end (4) and the second body end (5). The rotatable body section (10) has a radially outer side surface (12) extending between a first section end (13) near the first body end (4) and a second section end (14) near the second body end (5). The rotatable body section (10) has a size and shape allowing the user to rotate the rotatable body section (10) about the longitudinal axis (11) by performing a rolling action using three or more fingers (21, 22, 23). The controller (1) further comprises a sensing means (30) adapted to detect a rotation of the rotatable body section (10) about the longitudinal axis (11) and to provide a control signal ($S_c$) indicating one or more control commands to the electronic device in dependence on detecting a rotation.

The controller (1) is characterized in that the sensing means (30) further is adapted to distinguish between a three-finger rolling action and a corresponding two-finger rolling action and to provide the control signal ($S_c$) in dependence on detecting a three-finger rolling action.

This may provide a controller (1) with a significantly reduced rate of "false alarms" as well as an unobtrusive, reliable and at the same time simple and easy-to-use interface to the user.

15 Claims, 5 Drawing Sheets

(56) References Cited

U.S. PATENT DOCUMENTS 8,094,673 B2 1/2012 Proctor et al.
8,116,503 B2 2/2012 Daniels et al.
2009/0257604 A1 10/2009 Yeates
2011/0109552 A1 5/2011 Yasutake
2014/0294192 A1 10/2014 Haynes

* cited by examiner

CONTROLLER FOR CONTROLLING AN ELECTRONIC DEVICE

TECHNICAL FIELD

The present invention relates to a controller for controlling an electronic device. The invention may e.g. be used to control a headset or another electronic device connected to the controller.

BACKGROUND ART

The prior art comprises numerous disclosures of controllers for electronic devices, such as a headset or another device connected to a headset cable. Some known controllers are arranged on a headset cable and they typically have rather small buttons or other control elements that are difficult for a user to locate and manipulate without looking at the controller. Large control elements, on the other hand, demand large controllers, which in many situations are unappealing or impractical. Some suggestions have therefore been made to provide sensors within the headset cable itself, so that portions of the headset cable can function as control elements.

U.S. Pat. No. 8,094,673 B2 discloses a cable for headphones that enables control of a device to which the cable is connected. The user may touch or apply pressure to the cable, either along the full length or to a localized part of the cable, in order to control the device. Pressure applied by a user can be translated to control of the device. A signal from the controller is interpreted to understand what action (gesture or type of touching) the user performed, such as e.g. sliding the user's finger, or fingers (including thumb), up or down the cable, rotating the user's finger(s) around the cable, pressing and holding with two fingers, or gripping and holding with the user's whole hand. The entire cable may be implemented as a capacitive control. Alternatively, the cable input device may include an additional wire and a conductive or semi-conductive sleeve. By squeezing the cable, the sleeve and wire make contact with each other, thereby completing a circuit like a simple mechanical switch. Alternatively, the cable input device may include a plurality of channels whereby one of the channels carries a high frequency signal (out of the audible range) such that when fingers pinch the cable, capacitive coupling to another channel occurs, which may be detected. The cable input device may be implemented as a piezoelectric pressure sensor, such that mechanical action by the user is translated to a measurable electrical signal. Touching the cable itself may vary a resistance being measured through the cable input device.

U.S. Pat. No. 8,116,503 B2 discloses a bend switch that can be incorporated in a wire and that can control one or more device functions without requiring a user to look at the switch. The switch includes two substantially co-linear elongated bodies that have contact surfaces that oppose each other and that, in an open switch position, do not contact each other. To close the switch, the user can bend the elongated bodies relative to each other such that the contact surfaces of the elongated bodies come into contact. When contact is made, a signal can pass from one elongated body to the other by passing through the contact surfaces. A movable space member placed between the elongated bodies may provide unlimited bending orientations or define preferred bending orientations. The contact surface may include several separated conductive portions that a user can selectively actuate. The switch may assist the user in bending the switch in orientations that cause specific portions of a contact surface to come into contact with the opposing elongated body, and different signals can be provided by each conductive portion when that conductive portion contacts the opposing elongated body. Software can process different types of signals provided by the switch to control different device functions.

US Patent Application US 2009/0257604 A1 discloses a deformable controller for controlling a portable electronic device. A user can interact with the controller to cause it to deform and thereby provide user input to control the electronic device. The controller may be an in-line controller with a cable that couples to the electronic device. The controller may include a deformable outer shell and a plurality of electrical contacts internal to the deformable outer shell. When the outer shell is deformed, outer electrical contacts come in electrical contact with a central electrical contact or with each other, and thus, the controller may provide a signal that allows initiating different commands in the electronic device depending on the user pressing, pinching, rolling, bending, sliding, squeezing, rotating or twisting the deformable controller. The deformable controller may further make use of force sensitive devices, tact switches, or touch sensors on or within the deformable controller. The deformable controller may determine a force with which the deformable controller is being deformed and use such to command an electronic device. In addition, a direction and a magnitude of a rolling action can be determined and a predetermined command may be initiated in accordance with the direction and magnitude.

European Patent 2 403 270 B1 discloses a cord-based controller for an auxiliary device, such as a headset, used with a portable electronic device. A pressure-sensitive, and preferably bendable, material such as a piezoelectric pressure sensor may be placed within or on an audio cable. A plurality of control sensor elements may be provided, each producing a different control signal voltage transmitted along a single control signal electrical connector. The controlling sensor may comprise a flexible voltage generating sensor, such as a piezoelectric sensor, and the control signal may be generated by deformation of the sensor material, independent of power supplied to the auxiliary device and independent of power supplied to the portable electronic device. The controller may differentiate between presses in different regions of the piezoelectric sensor by using areas of different thickness, thereby allowing multiple buttons along the length of the sensor-bearing cord without the need to include additional sensor pads.

DISCLOSURE OF INVENTION

It is an object of the present invention to provide an unobtrusive, reliable and at the same time easy-to-use controller for controlling an electronic device.

This and other objects of the invention are achieved by the invention defined in the independent claims and further explained in the following description. Further objects of the invention are achieved by embodiments defined in the dependent claims and in the detailed description of the invention.

Within this document, the singular forms "a", "an", and "the" are intended to include the plural forms as well (i.e. to have the meaning "at least one"), unless expressly stated otherwise. Likewise, the term "any" is intended to include both the singular and the plural form, unless expressly stated otherwise. Correspondingly, the terms "has", "includes", "comprises", "having", "including" and "comprising"

specify the presence of respective features, operations, elements and/or components, but do not preclude the presence or addition of further entities. The term "and/or" generally includes any possible combination of one or more of the associated items. Steps or operations of any method disclosed herein need not be performed in the order disclosed, unless this is expressly stated.

Furthermore, when an element or entity is referred to as being "connected" or "coupled" to another element or entity, this includes direct connection (or coupling) as well as connection (or coupling) via intervening elements or entities, unless expressly stated otherwise. Also, unless expressly stated otherwise, when a signal is referred to as being "provided" or "conveyed" by a first entity to a second entity, this includes directly or indirectly transmitting the signal in its original form as well as any direct or indirect transmission that modifies the original signal and/or converts the signal into another domain and/or representation before it arrives at the second entity, provided that the information comprised by the signal received by the second entity is sufficient for the second entity to perform the specified actions with respect to the signal.

Ordinal attributes like "first", "second", "primary", "secondary", "main" and "auxiliary" are intended to allow distinguishing between different entities, and should not be construed as implying any order, hierarchy, dependency or precedency unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details essential to understanding the invention, while other details may be left out. Where practical, like reference numerals or literal identifiers are used for identical or corresponding parts.

MODE(S) FOR CARRYING OUT THE INVENTION

Figure 1:
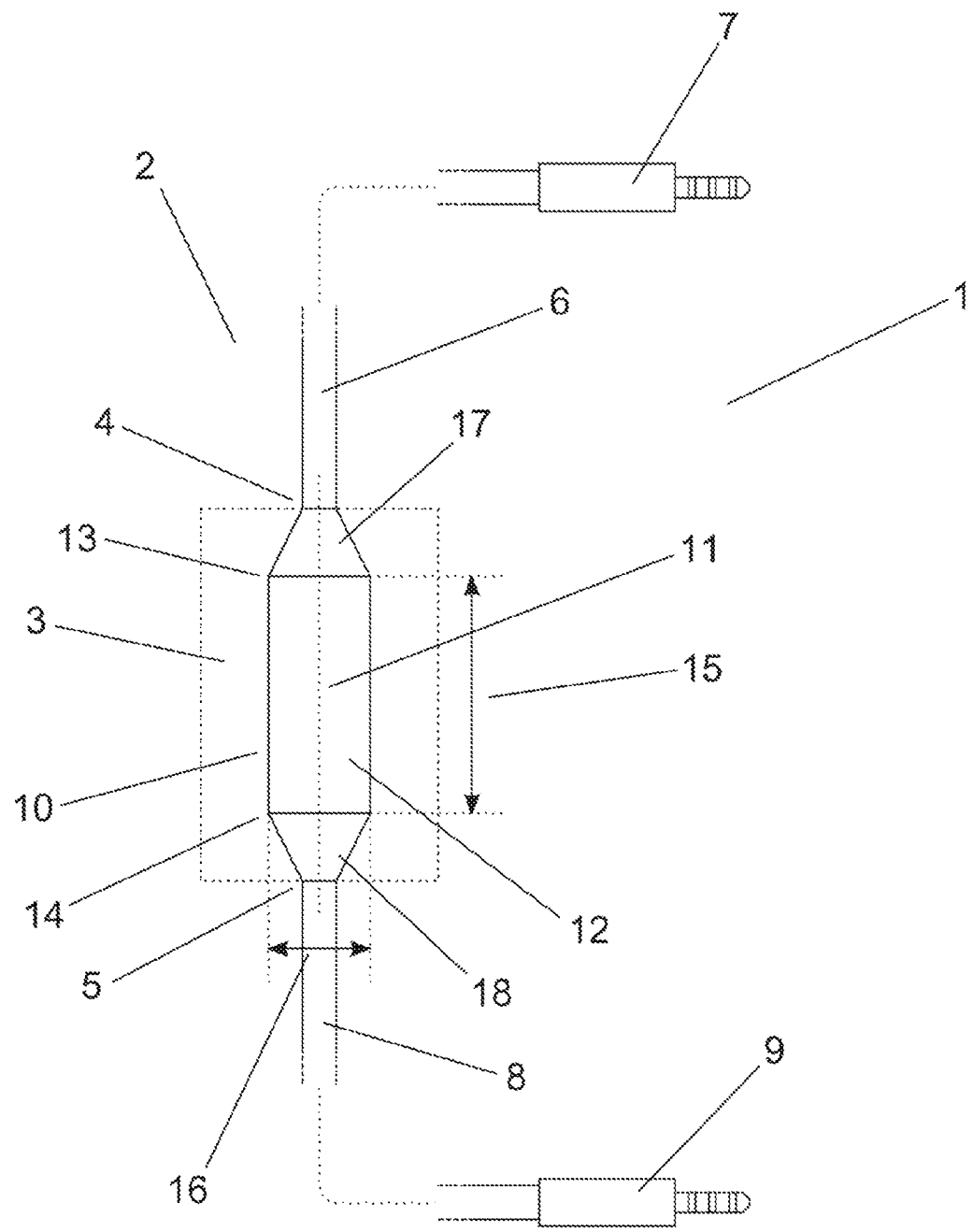
FIG. 1 shows an embodiment of a controller according to the invention.

The controller 1 shown in FIG. 1 comprises a headset cable 2 and an elongate controller body 3 in line with the headset cable 2. The controller body 3 has a first body end 4 and a second body end 5. The headset cable 2 comprises a first flexible cable section 6 mechanically and electrically connecting the first body end 4 with a first electrical connector 7 that may e.g. be used to connect the controller 1 to a headset (not shown). The headset cable 2 further comprises a second flexible cable section 8 mechanically and electrically connecting the second body end 5 with a second electrical connector 9 that may e.g. be used to connect the controller 1 to a media player, a mobile phone, a computer or another electronic device (not shown). The headset cable 2 may thus mechanically and electrically connect a first electronic device connected at the first electrical connector 7 with a second electronic device connected at the second electrical connector 9, such that e.g. a media player or a mobile phone can provide e.g. an audio signal to e.g. a headset through the headset cable 2 and preferably through the controller body 3.

The controller body 3 comprises an elongate rotatable body section 10 adapted to be rotated by a user about a longitudinal axis 11 that extends through the first body end 4 and the second body end 5. The rotatable body section 10 has a radially outer side surface 12 that extends between a first section end 13 near the first body end 4 and a second section end 14 near the second body end 5. The side surface 12 preferably extends across the entire outer surface of the controller body 3 between the first section end 13 and the second section end 14. The rotatable body section 10 has a size and shape allowing the user to rotate the rotatable body section 10 about the longitudinal axis 11 by performing a rolling action wherein three or more fingers touch the side surface 12. The side surface 12 thus preferably has a longitudinal extension 15 of e.g. at least 20 mm, more preferably at least 30 mm or most preferably at least 40 mm. The longitudinal extension 15 is preferably at most 100 mm, more preferably at most 80 mm or most preferably at most 60 mm. The rotatable body section 10 preferably has a lateral extension 16 of e.g. at most 35 mm, more preferably at most 25 mm or most preferably at most 15 mm. The lateral extension 16 is preferably at least 3 mm, more preferably at least 7 mm or most preferably at least 11 mm.

The controller body 3 may further comprise a first end piece 17 arranged at the first body end 4 and/or a second end piece 18 arranged at the second body end 5. The first and second end pieces 17, 18 may preferably be non-rotatably attached or connected to the respective first and second flexible cable sections 6, 8. In some embodiments, the rotatable body section 10 may be rotatable with respect to the first end piece 17 and/or the second end piece 18, while in other embodiments, the rotatable body section 10 may be non-rotatably attached or connected to the respective first and second end pieces 17, 18, such that the first and second end pieces 17, 18 and the headset cable 2 rotate together with the rotatable body section 10 in response to a rolling action performed by the user. In further embodiments, the rotatable body section 10 may be non-rotatably attached or connected at the first section end 13 to the first flexible cable section 6 and/or at the second section end 14 to the second flexible cable section 8, such that the headset cable 2 rotates together with the rotatable body section 10 in response to a rolling action performed by the user.

Figure 2:
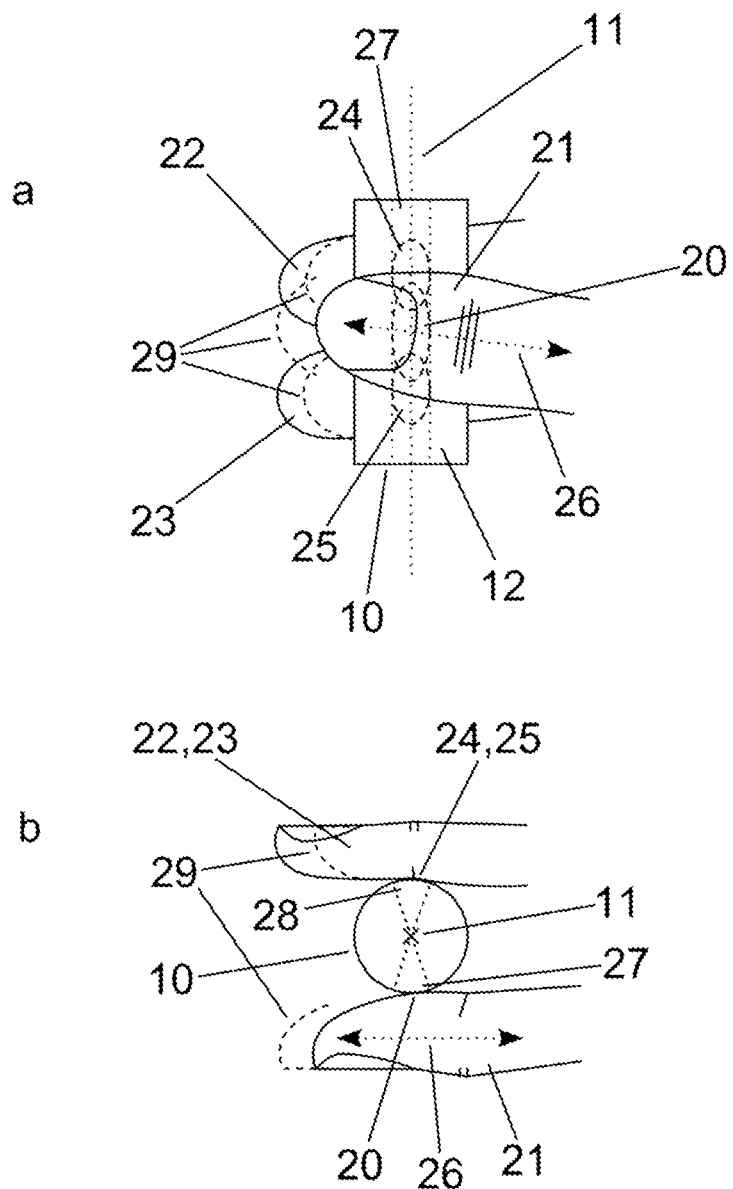
FIG. 2 illustrates a use of the controller of FIG. 1.

FIG. 2 illustrates respectively in a lateral view (FIG. 2a) and in a top axial view (FIG. 2b) a three-finger grip that may be part of a three-finger rolling action that may preferably be performed by a user in order to manipulate the rotatable body section 10 and cause it to rotate about the longitudinal axis 11. In the present context, the term "three-finger grip" refers to a user action comprising: touching a first portion 20 of the side surface 12 with a thumb 21 of one hand and touching with the index finger 22 and the middle finger 23 of the same hand respectively a second portion 24 and a third portion 25 of the side surface 12, each located radially or angularly opposite to the first surface portion 20, such that the three fingers 21, 22, 23 are aligned mainly laterally with respect to the longitudinal axis 11 and such that the second surface portion 24 extends beyond the first surface portion 20 in one direction along the longitudinal axis 11 and the third surface portion 25 extends beyond the first surface portion 20 in the respective opposite direction along the longitudinal axis 11. Furthermore, the term "three-finger rolling action" refers to a user action comprising a three-finger grip with a simultaneous moving of the thumb 21 in its length direction 26 with respect to the index and middle fingers 22, 23. During a three-finger grip, the angular extension of the first surface portion 20 defines a first angularly limited portion 27 of the side surface 12 that in the following is referred to as the "thumb side". Similarly, the angular extension of the second and third surface portions 24, 25 defines a second angularly limited portion 28 of the side surface 12 that in the following is referred to as the "two-finger side".

The three-finger grip shown in FIG. 2 may in principle occur at any time during a three-finger rolling action, e.g. at the begin thereof, at the end thereof and/or at one or more instants between the begin and the end of the three-finger rolling action. The dashed lines 29 indicate finger positions in a second three-finger grip that may occur at one or more other instants during the three-finger rolling action. In the two three-finger grips shown, the thumb 21 has different positions in its length direction 26 with respect to the index and middle fingers 22, 23, and the rotatable body section 10 may therefore have different rotation angles about the longitudinal axis 11. Relative to the rotatable body section 10, a three-finger rolling action may thus be seen as a rotating sequence of three-finger grips, and consequently, the first, second and third surface portions 20, 24, 25 as well as the thumb side 27 and the two-finger side 28 rotate relative to the rotatable body section 10 about the longitudinal axis 11 during execution of a three-finger rolling action.

The three-finger rolling action defined and described above causes distinctive patterns of touches, pressure forces and bending forces on the rotatable body section 10, and the controller 1 may preferably detect one or more of these patterns and thus distinguish between a three-finger rolling action and a rotation caused by other actions, such as e.g. a two-finger rolling action, i.e. an action similar to a three-finger rolling action wherein, however, only one of the index finger 22 and the middle finger 23 touches the side surface 12. The controller 1 preferably sends one or more predefined control commands to a connected electronic device when it distinguishes and detects a three-finger rolling action and may thus control one or more functions of the connected electronic device. Compared to prior art controllers, distinguishing and detecting three-finger rolling actions allows the controller 1 to achieve a significantly reduced rate of "false alarms", i.e. control commands that are not intentionally caused by the user. At the same time, a three-finger rolling action is a type of manipulation that is easy to learn and easy to perform for most persons, such that the controller 1 may provide a simple and easy-to-use interface to the user.

Furthermore, with an appropriate design of the controller body 3, the user may easily locate the controller body 3 along a wire, such as e.g. a headset cable 2, and perform a three-finger rolling action without looking at the controller 1.

Figure 3:
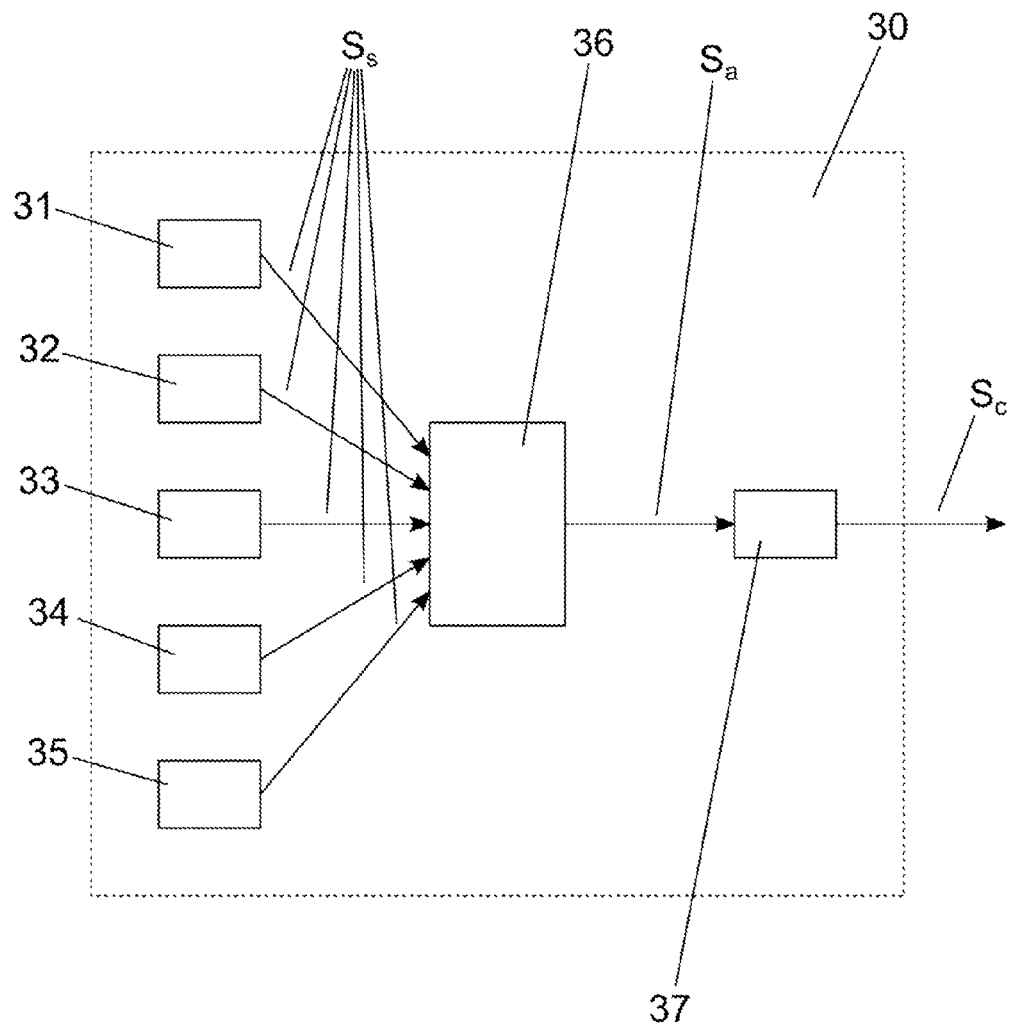
FIG. 3 shows a block diagram of the controller of FIG. 1.

The controller 1 may preferably further comprise a sensing means 30 as shown in the block diagram in FIG. 3. The sensing means 30 preferably comprises one or more sensors 31-35, each providing a sensor signal $S_s$, an action detector 36 that detects and distinguishes between different user actions by evaluating one or more sensor signals $S_s$ and provides a corresponding action signal $S_a$ indicating one or more detected user actions and a control unit 37 that provides a control signal $S_c$ indicating one or more control commands in dependence on the user actions indicated in the action signal $S_a$. The sensing means 30 preferably provides the control signal $S_c$ to an electronic device connected to the controller 1 by means of a wired or a wireless connection.

The action detector 36 preferably evaluates one or more sensor signals $S_s$ in order to detect a rotation of the rotatable body section 10 about the longitudinal axis 11 and to determine whether a detected rotation was caused by a user performing a three-finger rolling action or by another type of action, such as a two-finger rolling action. The action detector 36 may e.g. detect a sequence of three-finger grips that rotate relative to the rotatable body section 10 about the longitudinal axis 11 and indicate a three-finger rolling action based on the detected grip sequence. The action detector 36 may preferably evaluate one or more sensor signals $S_s$ in order to distinguish between a three-finger rolling action and a corresponding two-finger rolling action and/or further predefined user actions. The control unit 37 preferably evaluates the user action or user actions indicated in the action signal $S_a$, determines one or more predefined control commands in dependence thereon and indicates the determined one or more control commands in the control signal $S_c$. The control unit 37 may preferably further determine the one or more control commands in dependence on previous values of the action signal $S_a$ and/or on previous and/or current values of the control signal $S_c$ in order to detect predefined sequences of user actions. The controller 1 may thus provide different control commands for different detected user actions and/or for different detected sequences of user actions.

The action detector 36 may preferably also detect further parameters related to detected rolling actions, such as the direction of the rotation (i.e. clockwise or anticlockwise), the magnitude of the rotation (i.e. the traversed angle), the speed of the rotation (i.e. the angular velocity) and/or any variations thereof during the rolling action and indicate different control commands in dependence on recognizing different predefined values, ranges and/or patterns in the further parameters. One simple example hereof is to provide different sets of user actions for clockwise and anticlockwise rotation.

The sensing means 30 may preferably comprise one or more proximity sensors 31, each providing a sensor signal $S_s$ indicating when a finger 21, 22, 23 is close to the side surface 12. The sensing means 30 may preferably comprise multiple proximity sensors 31 adapted to detect the proximity of fingers 21, 22, 23 to different portions of the side surface 12. This may allow the action detector 36 to detect and track different locations of the user's fingers 21, 22, 23 relative to the rotatable body section 10 and thus detect grips, rolling actions, sliding actions, approaching actions, retracting actions, etc. In particular, a three-finger grip may be detected based on sensing proximity of a finger 21, 22, 23 at three distinct portions of the side surface 12, such as e.g. portions like the first, second and third surface portions 20, 24, 25, and a three-finger rolling action may be detected based on detecting a relative rotation of the surface portions 20, 24, 25 about the longitudinal axis 11. Alternatively to detecting two distinct surface portions 24, 25 for the index and middle fingers 22, 23, the action detector 36 may determine a longitudinal extension, i.e. along the longitudinal axis 11, of a combined surface portion 24, 25 and determine a three-finger grip or rolling action when the longitudinal extension exceeds a predefined threshold, such as e.g. about 20 mm or about 25 mm. The proximity sensors 31 may detect proximity in any known way, such as e.g. by means of providing and/or detecting capacitive, acoustic and/or optical signals. The proximity sensors 31 allows the controller to also distinguish between a three-finger rolling action and a two-finger rolling action when the user's fingers 21, 22, 23 are covered by a glove.

Figure 4:
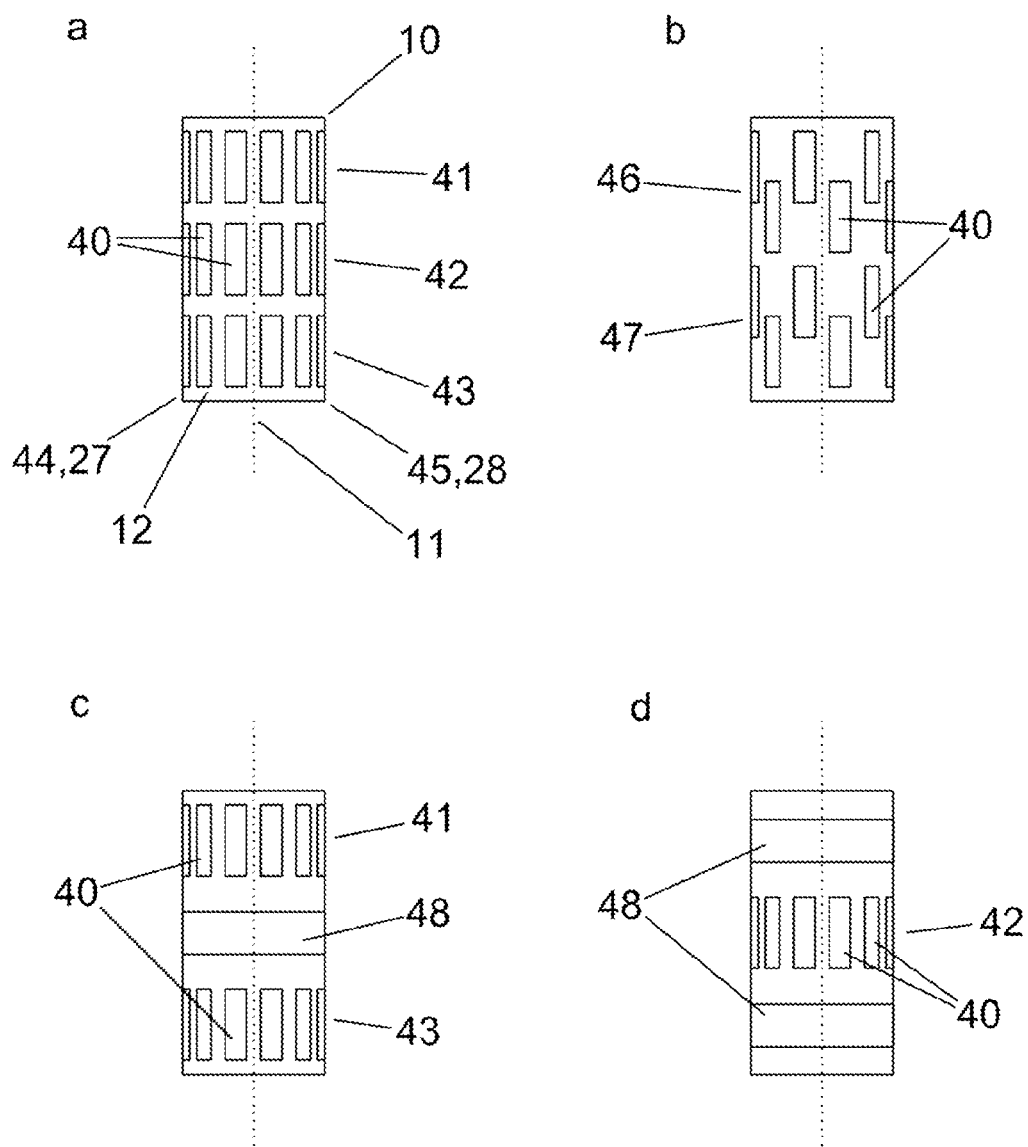
FIG. 4 shows details of different embodiments of a controller according to the invention.

FIG. 4 shows different possible layouts of sensing areas 40 of the side surface 12 of the rotatable body section 10. Each sensing area 40 is assigned to a proximity sensor 31, which is adapted to detect proximity of a finger 21, 22, 23 to one or more of its assigned sensing areas 40. Any proximity sensor 31 may have exactly one assigned sensing area 40 or multiple assigned sensing areas 40, depending on the type of the proximity sensor 31. In general, however, each proximity sensor 31 may preferably be adapted to distinguish proximity to each of its assigned sensing areas 40. The size, shape and location of each sensing area 40 depends on the type, size, shape and location of the sensor element or elements (not shown) that the particular proximity sensor 31 comprises for sensing proximity.

In the embodiment shown in FIG. 4a, the side surface 12 comprises multiple sensing areas 40 arranged in three annular rows 41, 42, 43 at different locations along the longitudinal axis 11. Within each row 41, 42, 43, multiple sensing areas 40 are arranged at equiangular positions along the circumference of the rotatable body section 10. The action detector 36 may indicate detection of a three-finger grip e.g. in dependence on one or more proximity sensors 31 indicating proximity of a finger 21, 22, 23 to sensing areas 40 in one or in two adjacent rows 41, 42, 43 on a first side 44 of the rotatable body section 10 and proximity of a finger 21, 22, 23 to sensing areas 40 in each of the top row 41 and the bottom row 43 on the second, radially opposite side 45 of the rotatable body section 10. The action detector 36 may interpret such a pattern as the first side 44 being the thumb side 27 and the second side 45 being the two-finger side 28. The action detector 36 may determine a user action to not be a three-finger grip e.g. when one or more proximity sensors 31 indicate proximity of fingers 21, 22, 23 to sensing areas 40 in both the top row 41 and the bottom row 43 on the first side 44, thus indicating proximity of more than one finger 21, 22, 23. The action detector 36 may further determine a user action to not be a three-finger grip e.g. when none of the proximity sensors 31 indicate proximity of a finger 21, 22, 23 to sensing areas 40 in any of the top row 41 and the bottom row 43 on the second side 45, thus indicating proximity of at most one finger 21, 22, 23. When both of the latter conditions are simultaneously detected, the action detector 36 may, however, indicate a three-finger grip with reversed orientation of the thumb side 27 and the two-finger side 28. In other embodiments, the multiple sensing areas 40 may be arranged in only two rows 41, 43 at different locations along the longitudinal axis 11. In this case, the distance between the top row 41 and the bottom row 43 should be large enough to prevent the proximity sensors 31 from simultaneously indicating proximity of a finger 21, 22, 23 to sensing areas 40 in each of the rows 41, 43 during a two-finger grip, i.e. a grip with at most one finger 21, 22, 23 proximate to each of the first and second sides 44, 45.

FIG. 4b shows a similar embodiment wherein the side surface 12 comprises multiple sensing areas 40 arranged in two rows 46, 47 at different locations along the longitudinal axis 11. Within each row 46, 47, multiple sensing areas 40 are arranged at equiangular positions along the circumference of the rotatable body section 10, however with alternating positions in the longitudinal direction 11. In this embodiment, the action detector 36 may not be able to distinguish a three-finger grip from a two-finger grip at some rotation angles of the rotatable body section 10. Nevertheless, the action detector 36 may evaluate a sequence of proximity indications from the individual proximity sensors 31 occurring during a rolling action to distinguish between a three-finger rolling action and a two-finger rolling action and thus correspondingly assume the application of a three-finger grip or a two-finger grip. FIGS. 4c and 4d show further variants of the embodiment of FIG. 4a. In FIG. 4c, the middle row 42 has been replaced with a single sensing area 48 arranged to cover the entire 360° angular range. In FIG. 4d, each of the top and bottom rows 41, 43 has been replaced with a respective single sensing area 48 arranged to cover the entire 360° angular range. In both embodiments, the action detector 36 may evaluate the sequence of proximity indications from the individual proximity sensors 31 occurring during a rolling action to distinguish between a three-finger rolling action and a two-finger rolling action. In any embodiment, the action detector 36 may evaluate the sequence of proximity indications from the individual proximity sensors 31 occurring during a rolling action and indicate a three-finger rolling action even when one or more portions of the rolling action are detected to be two-finger rolling actions.

The sensing means 30 may preferably comprise one or more touch sensors 32, each providing a sensor signal $S_s$ indicating when a finger 21, 22, 23 is touching the side surface 12. The sensing means 30 may preferably comprise multiple touch sensors 32 adapted to detect fingers 21, 22, 23 touching different portions of the side surface 12. This may allow the action detector 36 to detect grips, rolling actions, sliding actions, etc. in substantially the same ways as described above for the proximity sensors 31. The one or more touch sensors 32 may detect touching in any known way, such as e.g. by means of providing and/or detecting electric, capacitive, acoustic and/or optical signals and/or by detecting one or more pressure forces on the side surface 12. The one or more touch sensors 32 may preferably each have one or more assigned sensing areas, such as sensing areas similar to the sensing areas 40, 48 shown in FIG. 4, and be adapted to detect a finger 21, 22, 23 touching the respective one or more sensing areas 40, 48. In some embodiments, any or all of the sensing areas 40, 48 shown in FIG. 4 may alternatively, or additionally, to a proximity sensor 31 each be assigned to a respective touch sensor 32 adapted to detect a finger 21, 22, 23 touching the sensing area 40, 48. The action detector 36 may indicate detection of a three-finger grip and/or a three-finger rolling action in dependence on one or more touch sensors 32 indicating fingers 21, 22, 23 touching one or more sensing areas 40, 48 in substantially the same ways as described above for the proximity sensors 31.

The sensing means 30 may preferably comprise one or more pressure-force sensors 33, each providing a sensor signal $S_s$ indicating when a pressure force is applied to the side surface 12. The sensing means 30 may preferably comprise multiple pressure-force sensors 33 adapted to detect pressure forces on different portions of the side surface 12. This may allow the action detector 36 to detect grips, rolling actions, sliding actions, etc. in substantially the same ways as described above for the proximity sensors 31 and the touch sensors 32. The one or more pressure-force sensors 33 may detect pressure force in any known way, such as e.g. by analysing an electric output of a piezoelectric material or a strain gauge embedded in or attached to the rotatable body section 10, etc. The one or more pressure-force sensors 33 may preferably each have one or more assigned sensing areas, such as sensing areas similar to the sensing areas 40, 48 shown in FIG. 4, and be adapted to detect a pressure force on the respective one or more sensing areas 40, 48. In some embodiments, one or more pressure-force sensors 33 may each act as a touch sensor 32. In some embodiments, any or all of the sensing areas 40, 48 shown in FIG. 4 may alternatively, or additionally, to a proximity sensor 31 and/or a touch sensor 32 each be assigned to a pressure-force sensor 33 adapted to detect a pressure force applied to the respective sensing area 40, 48.

The action detector 36 may indicate detection of a three-finger grip and/or a three-finger rolling action in dependence on one or more pressure-force sensors 33 indicating a pressure force on one or more sensing areas 40, 48 in substantially the same ways as described above for the proximity sensors 31 and the touch sensors 32.

One or more of the pressure-force sensors 33 may further be adapted to determine and indicate a magnitude of the pressure force applied to the respective one or more sensing areas 40, 48. Furthermore, the action detector 36 may compare pressure-force magnitudes indicated by one or more pressure-force sensors 33 with one or more predefined thresholds and/or with each other and indicate different user actions in dependence on the comparison results. The action detector 36 may e.g. indicate a predefined user action in dependence on a detected pressure-force magnitude exceeding a predefined threshold and otherwise indicate a different user action or not indicate the respective user action. The action detector 36 may further indicate different user actions depending on which of multiple predefined pressure-force ranges a detected pressure-force magnitude falls within. The action detector 36 may alternatively or additionally indicate a first user action in dependence on a first pressure-force magnitude detected on a sensing area 40, 48 in a first row, such as e.g. a top row 41, 46, exceeding by a predefined amount or ratio a second pressure-force magnitude detected on a sensing area 40, 48 in a second row, such as e.g. a bottom row 43, 47, and otherwise indicate a different user action or not indicate the first user action. The action detector 36 may further indicate a third different user action in dependence on the second pressure-force magnitude exceeding the first pressure-force magnitude by the predefined amount or ratio. The controller 1 may thus provide a first control command when the user performs a three-finger grip or a three-finger rolling action while applying a larger pressure force against the side surface 12 with the index finger 22 than with the middle finger 23 and provide a second different control command when the user reverses the applied pressure forces.

Figure 5:
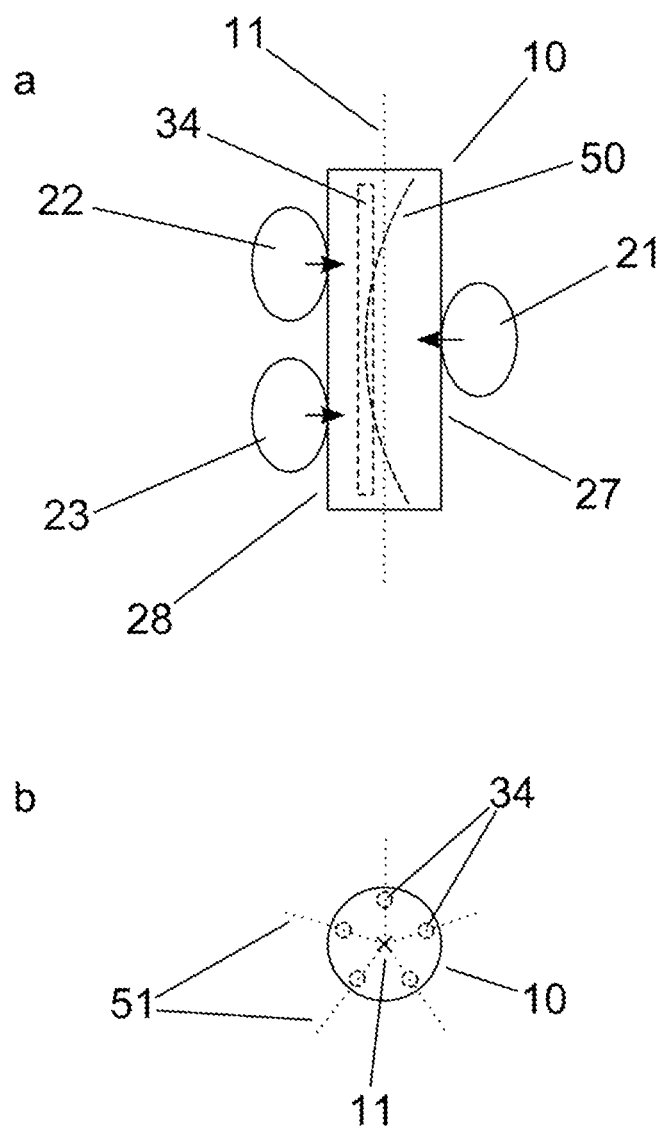
FIG. 5 shows details of a further embodiment of a controller according to the invention.

As shown in FIG. 5, respectively in a lateral view (FIG. 5a) and in a top axial view (FIG. 5b), the sensing means 30 may preferably comprise one or more bending-force sensors 34, each providing a sensor signal $S_s$ indicating when a bending force 50 is applied to the rotatable body section 10. The one or more bending-force sensors 34 may detect bending force in any known way, such as e.g. by analysing an electric output of a piezoelectric material or a strain gauge embedded in or attached to the rotatable body section 10, etc. The sensing means 30 may preferably comprise multiple bending-force sensors 34 adapted to detect bending forces 50 acting in different angular directions 51 about the longitudinal axis 11. The number of bending-force sensors 34 may e.g. be 1, 2, 3, 5 or more, and is preferably chosen in dependence on a desired angular resolution and/or precision of the sensor signal $S_s$ from the bending-force sensors 34. One or more of the bending-force sensors 34 are preferably further adapted to determine and indicate a magnitude and/or the angular direction 51 of the respective detected bending forces 50. The action detector 36 may detect user actions such as three-finger grips and three-finger rolling actions by evaluating one or more indicated magnitudes and/or angular directions of detected bending forces 50. The action detector 36 may e.g. detect a three-finger grip in dependence on the one or more bending-force sensors 34 indicating a bending force 50 with a magnitude exceeding a predefined threshold. In particular, the action detector 36 may detect a three-finger rolling action in dependence on the one or more bending-force sensors 34 indicating a relative rotation about the longitudinal axis 11 of a bending force 50 and/or in dependence on the one or more bending-force sensors 34 providing a sequence of indications of a bending force 50 wherein the angular directions 51 of the respective bending forces 50 indicate a relative rotation about the longitudinal axis 11. The detection of a three-finger rolling action may further depend on the magnitude of the one or more bending forces 50. The action detector 36 may further indicate different user actions depending on which of multiple predefined bending-force ranges a detected bending-force magnitude falls within.

The sensing means 30 may preferably comprise one or more motion or orientation sensors 35, each providing a sensor signal $S_s$ indicating a motion of the rotatable body section 10, such as e.g. a rotation about the longitudinal axis 11 or another axis, a linear movement or an acceleration, or an orientation of the rotatable body section 10, e.g. with respect to a gravity field, a magnetic field, an electrical field, a sound source and/or a light source. The action detector 36 may detect one or more user actions by evaluating one or more indicated motions or orientations of the rotatable body section 10. The action detector 36 may e.g. indicate a rolling action in dependence on one or more rotation sensors 35 indicating a rotation of the rotatable body section 10 about the longitudinal axis 11 and/or in dependence on one or more orientation sensors 35 indicating a sequence of orientations that suggests such a rotation. The one or more motion or orientation sensors 35 may detect motion or orientation in any known way, such as e.g. by means of one or more accelerometers, gyroscopes, magnetic sensors, electric field sensors, microphones and/or optical sensors.

The action detector 36 may preferably detect one or more user actions by evaluating multiple sensor signals $S_s$ from two, three or more different classes of sensors 31-35, wherein the five sensor classes disclosed herein cover respectively proximity sensors 31, touch sensors 32, pressure-force sensors 33, bending-force sensors 34 and motion/orientation sensors 35. The action detector 36 may e.g. use such multiple sensor signal $S_s$ to increase the reliability of the detection of user actions. For instance, when the sensor signals $S_s$ from two or more sensors 31-35 of different class simultaneously comprise indications of a particular rolling action, the action detector 36 may indicate the particular user action in the action signal $S_a$. Conversely, when two or more sensors 31-35 of different class disagree, the action detector 36 may determine the absence of the particular user action and thus not indicate it. The action detector 36 may alternatively or additionally use multiple sensor signal $S_s$ from two or more sensors 31-35 from two, three or more different classes to distinguish further between different user actions and thus increase its repertoire and allow the controller 1 to provide a wider range of control commands. For instance, the action detector 36 may evaluate the sensor signals $S_s$ from one or more proximity sensors 31, touch sensors 32, pressure-force sensors 33 or bending-force sensors 34 to detect a three-finger rolling action and evaluate the sensor signals $S_s$ from one or more motion or orientation sensors 35 to detect a further motion of the rotatable body section 10 and/or a particular orientation of the rotatable body section 10 during the three-finger rolling action and indicate different user actions in dependence on different further motions of the rotatable body section 10 and/or on different orientations of the rotatable body section 10 during the three-finger rolling action.

For instance, the action detector 36 may in response to detecting a three-finger rolling action determine an orientation of the thumb side 27 in dependence on sensor signals $S_s$ from one or more sensors 31-35, compare the determined orientation of the thumb side 27 with one or more predefined orientation ranges, indicate a first user action when the determined orientation of the thumb side 27 is within a predefined orientation range indicating that the thumb side 27 is oriented downwards and otherwise a indicate a second different user action. Similarly, the action detector 36 may indicate a third different user action in response to detecting a three-finger rolling action with the thumb side 27 oriented upwards and/or a fourth different user action in response to detecting a three-finger rolling action with the longitudinal axis 11 oriented vertically. The action detector 36 may further indicate a fifth different user action in response to detecting a three-finger rolling action wherein a determined orientation of the longitudinal axis 11 and/or of the thumb side 27 transitions from one predefined orientation range to a second predefined orientation range during the rolling action.

The controller 1 may thus for instance provide different control commands in dependence on whether the user performs a three-finger rolling action with the thumb side 27 oriented upwards, downwards or rather vertically. Together with a discrimination of the rotation direction this allows the controller 1 to provide at least six different control commands in response to a three-finger rolling action. Using further parameters, the controller 1 may provide many more different control commands.

Furthermore, letting the action detector 36 evaluate multiple sensor signals $S_s$ from different classes of sensors 31-35 may allow a reduction of the number of sensors 31-35 and/or of the complexity of one or more of the sensors 31-35 without compromising the ability to distinguish a three-finger rolling action from a two-finger rolling action. For instance, the use of a motion or orientation sensor 35 that can indicate a rotation may allow a substantial reduction of the number of sensor areas 40, 48 within each row 41, 42, 43, 46, 47. Also, the action detector 36 may use a sensor signal $S_5$ from a sensor 31-35 that consumes relatively little power to detect a wake-up action, such as e.g. a motion or a touch of the controller body 3, and provide power to one or more other sensors 31-35, that may e.g. consume relatively much power, in response to detecting a wake-up action. The action detector 36 may shut off power to the one or more other sensors 31-35 e.g. after a predefined time period without any detected user actions.

The rotatable body section 10 is preferably rigid in order to allow a user a high degree of control over the position and orientation of the rotatable body section 10 during a rolling action. The side surface 12 may, however, be slightly resilient in order to allow the user a secure grip. The side surface 12 may thus have a relatively thin resilient outer layer or "skin" comprising e.g. rubber or a similar material with a thickness of preferably less than 1 mm, such as e.g. about 0.5 mm or about 0.2 mm.

The rotatable body section 10 may be cylindrical as shown in FIGS. 2 and 5. Preferably, however, the rotatable body section 10 has one or more features on the side surface 12 that provide a tactile feedback to the user of the angle of rotation and/or of the positions of the fingers 21, 22, 23 along the longitudinal axis 11. The rotatable body section 10 may thus have one of many other "roundish" rod-like shapes.

For instance, the general cross section of the rotatable body section 10 perpendicular to the longitudinal axis 11 may be substantially circular. The rotatable body section 10 may have a number of longitudinally aligned indentations or grooves and/or protrusions or ridges for providing tactile feedback about the angle of rotation. Alternatively, the cross section may have a shape substantially like a regular polygon having 5 or more convex vertexes, e.g. 8, 7, 6 or 5 convex vertexes. The edges (of the cross section) between the convex vertexes may be concave or recessed to improve the tactile feedback. Furthermore, the convex vertexes may be rounded. The rotatable body section 10 may further comprise one or more control elements, such as e.g. an electromechanical power switch, which are preferably arranged in or at a recessed or concave surface portion of the side surface 12.

The cross section of the rotatable body section 10 may be identical along the entire length of the rotatable body section 10. Alternatively, the cross section may vary along the longitudinal axis 11 in order to provide tactile feedback of the longitudinal positions of the fingers 21, 22, 23. The rotatable body section 10 may for instance have an outline of constant width 16. The rotatable body section 10 may have two annular protrusions dividing the side surface 12 into three sections, such that the user may place e.g. the thumb 21 on the middle section, the index finger 22 on the top section and the middle finger 23 on the bottom section. The lateral sides of the outline may alternatively be convex, such that the width 16 increases towards the middle of the rotatable body section 10, or the lateral sides of the outline may be concave, such that the width 16 decreases towards the middle of the rotatable body section 10. In a further alternative, the outline may comprise three concave sections, such that the user may place e.g. the thumb 21 on the middle section, the index finger 22 on the top section and the middle finger 23 on the bottom section. The cross section may vary along the longitudinal axis 11 in other ways, such as e.g. twist and/or change one or more vertex radii, and the variation may be smooth or non-smooth. Preferably, however, the general shape of the rotatable body section 10 should allow it to be easily manipulated and to provide a reasonable amount of tactile feedback.

The controller 1 may comprise a power supply (not shown) for energizing the sensing means 30. The power supply may comprise a power storage, such as e.g. a rechargeable battery, and/or an internal power source, such as e.g. an exchangeable battery, a fuel cell or a photovoltaic cell. The sensing means 30 and/or the power storage may be powered by the internal power source and/or by an external power source, such as e.g. by a power source provided by an electronic device connected to the controller 1. The controller 1 may e.g. harvest energy from audio signals provided by an electronic device to a headset through the headset cable 2 or from power transducers embedded in the headset cable 2 or in the controller body 3 that transform mechanical energy into electrical energy.

The controller 1 may comprise a transmitter (not shown) for transmitting the control signal $S_c$ provided by the sensing means 30 to one or more electronic devices. The transmitter may provide the control signal $S_c$ in any known way, such as in the form of an analog signal and/or in the form of a digital signal. The transmitter may provide the control signal $S_c$ through one or more dedicated leads and connector contacts of the headset cable 2 and/or provide the signal to one or more leads and connector contacts in the headset cable 2 that are also used for carrying e.g. an audio signal or a power supply from an electronic device to a headset through the headset cable 2. The transmitter may add the control signal $S_c$ to other signals, such as the mentioned audio signal or power supply, by means of modulation, summation, mixing, multiplexing or the like, depending on the type of signal the control signal $S_c$ is added to. Alternatively, the transmitter may provide the control signal $S_c$ as a wireless signal, such as e.g. an optical signal, an acoustic signal or a radio-frequency signal, e.g. as an inductive Near-Field Communication signal. The transmitter may e.g. comprise a Bluetooth transceiver (not shown) or a Bluetooth Low Energy transceiver (not shown) for transmitting the control signal $S_c$ through respectively a Bluetooth radio connection or a Bluetooth Low Energy network.

The sensing means 30 and/or the transmitter may be comprised entirely by the controller body 3. Alternatively, one or more portions hereof, such as e.g. the action detector 36, the control unit 37, the power supply and/or the transmitter, may be comprised by another part of the controller 1, such as e.g. the headset cable 2 and/or a housing of an electric connector 7, 9. The controller 1 may comprise an electronic device, such as a headset, (not shown) that may be mechanically, electrically and/or wirelessly connected to the controller body 3 and that is adapted to control its operation in dependence on a control signal $S_c$ received from the sensing means 30 and/or the transmitter. One or more portions of the sensing means 30 and/or the transmitter may be comprised by such an electronic device comprised by the controller 1.

At one or each of the body ends 4, 5, the controller 1 may instead of the respective flexible cable section 6, 8, comprise a respective connector (not shown) for detachably, electrically and mechanically connecting the controller body 3 to an electronic device, such as e.g. a headset, to be controlled by the controller 1. In some embodiments, the controller body 3 may be electrically and mechanically connected or connectable to an electronic device only at one of its body ends 4, 5 and may thus e.g. be used hanging like a pendant from a headset connected to the controller body 3. In further embodiments, the controller body 3 may be adapted to operate without being electrically and mechanically connected to an electronic device to be controlled and may thus be used as a stand-alone controller 1 that wirelessly transmits one or more control signals $S_c$ to one or more electronic devices, e.g. like a conventional wireless remote control device.

In any embodiment, the controller 1, and in particular the sensing means 30 and/or the transmitter, preferably comprise one or more electronic circuits, such as e.g. analog circuits, digital circuits, microprocessors, signal processors or the like, adapted to perform the described operations as is already known for similar devices of the prior art. Such electronic circuits are preferably implemented as digital circuits operating on digital signals, but any portions hereof may be implemented as analog circuits operating on analog signals. Where necessary, any of the electronic circuits may comprise analog-to-digital and/or digital-to-analog converters. Functional blocks of digital circuits may be implemented in hardware, firmware or software, or any combination hereof. Digital circuits may perform the functions of multiple functional blocks in parallel and/or in interleaved sequence, and functional blocks may distributed in any suitable way among multiple hardware units, such as e.g. signal processors, microcontrollers and other integrated circuits.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. The mere mentioning of such changes or modifications herein is meant to be non-limiting for the scope of the invention.

The invention is not limited to the embodiments disclosed herein, and the invention may be embodied in other ways within the subject-matter defined in the following claims. As an example, features of the described embodiments may be combined arbitrarily, e.g. in order to adapt the methods or devices according to the invention to specific requirements or uses. Also, the disclosed embodiments may be further adapted to detect, distinguish and react to e.g. a similar four-finger rolling action or a similar five-finger rolling action.

Reference numerals and literal identifiers that appear in brackets in the claims are intended to be non-limiting for their scope.

The invention claimed is:

1. A controller for controlling an electronic device,
   the controller comprising an elongate controller body having a first body end and a second body end,
   the controller body comprising an elongate rotatable body section adapted to be rotated by a user about a longitudinal axis extending through the first body end and the second body end,
   the rotatable body section having a radially outer side surface extending between a first section end near the first body end and a second section end near the second body end,
   the rotatable body section having a size and shape allowing the user to rotate the rotatable body section about the longitudinal axis by performing a rolling action using three or more fingers,
   the controller further comprising a sensor unit adapted to detect a rotation of the rotatable body section about the longitudinal axis and to provide a control signal indicating one or more control commands to the electronic device in dependence on detecting a rotation,
   characterized in that the sensor unit further is adapted to distinguish between a three-finger rolling action and a corresponding two-finger rolling action and to provide the control signal in dependence on detecting a three-finger rolling action,
   wherein the three-finger rolling action comprising touching a first portion of the side surface with a thumb of one hand and touching with the index finger and the middle finger of the same hand respective second and third portions of the side surface radially opposite to the first portion, such that the three fingers are aligned mainly laterally with respect to the longitudinal axis and such that the second surface portion extends beyond the first surface portion in one direction along the longitudinal axis and the third surface portion extends beyond the first surface portion in the respective opposite direction along the longitudinal axis, and moving the thumb in its length direction with respect to the index and middle fingers.

2. A controller according to claim 1, wherein the sensor unit further is adapted to distinguish between a three-finger rolling action and a two-finger rolling action when the user's fingers are covered by a glove.

3. A controller according to claim 1, wherein the sensor unit comprises a proximity sensor adapted to detect when a finger is close to the side surface.

4. A controller according to claim 1, wherein the sensor unit comprises a touch sensor adapted to detect when a finger touches the side surface.

5. A controller according to claim 1, wherein the sensor unit comprises a pressure-force sensor adapted to detect exertion of a pressure on the side surface.

6. A controller according to claim 1, wherein the sensor unit comprises a bending-force sensor adapted to detect exertion of a bending force on the rotatable body section along the longitudinal axis.

7. A controller according to claim 1, wherein the sensor unit comprises a rotation sensor adapted to detect a rotation of the rotatable body section about the longitudinal axis.

8. A controller according to claim 1, wherein the sensor unit further is adapted to distinguish between a three-finger rolling action and a two-finger rolling action by combining sensor signals from two or more different classes of sensors.

9. A controller according to claim 1, wherein the sensor unit further is adapted to detect a rotation of the rotatable body section about the longitudinal axis by combining sensor signals from two or more different classes of sensors.

10. A controller according to claim 1, wherein the rotatable body section is rigid.

11. A controller according to claim 1, wherein the general cross section of the rotatable body section perpendicular to the longitudinal axis has a substantially circular shape or a shape substantially like a regular polygon having five or more convex vertexes.

12. A controller according to claim 1, wherein the controller body comprises a first end piece arranged at the first body end and/or a second end piece arranged at the second body end, and wherein the rotatable body section is rotatable with respect to the first end piece and/or the second end piece.

13. A controller according to claim 1, wherein the first section end constitutes the first body end and/or the second section end constitutes the second body end.

14. A controller according to claim 1, wherein the first body end and/or the second body end comprises a connector for detachably connecting a cable.

15. A controller according to claim 1, wherein the controller further comprises a cable with a first flexible cable section mechanically and electrically connected to the first body end and/or a second flexible cable section mechanically and electrically connected to the second body end.

* * * * *